Figure 1:
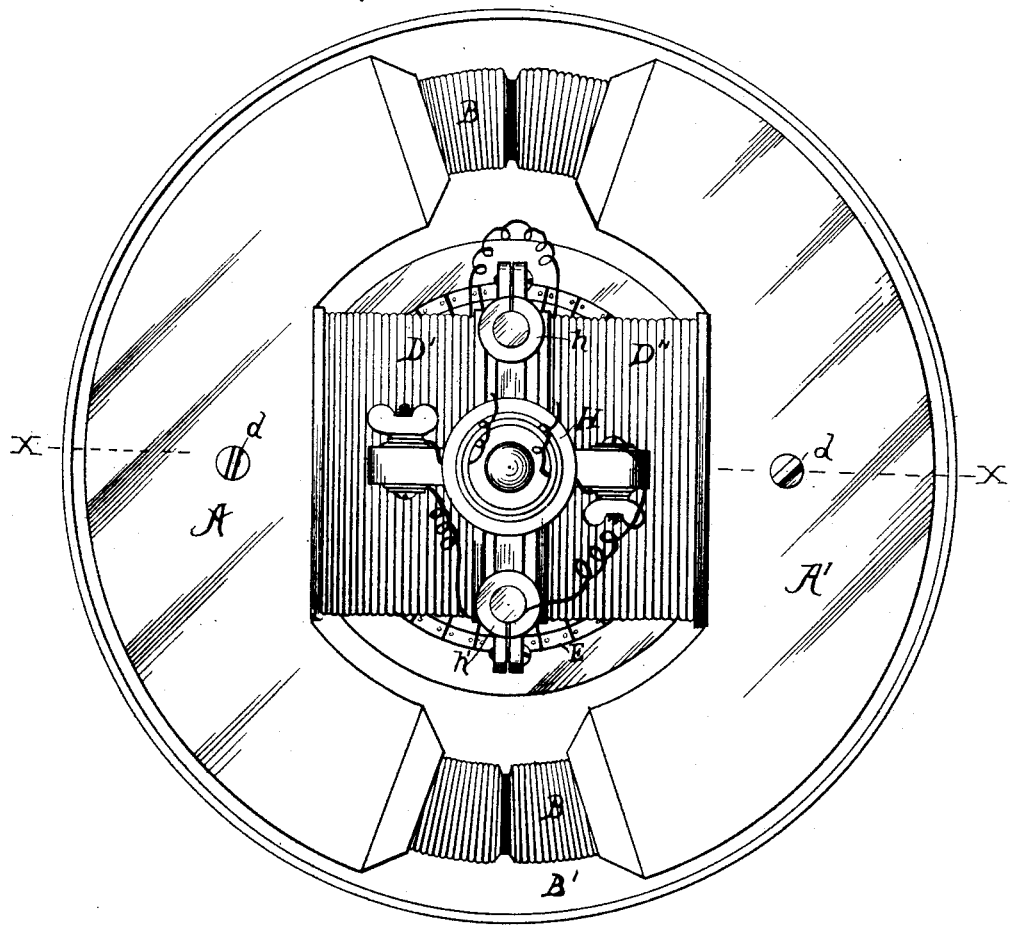

(No Model.)  
2 Sheets—Sheet 1.

O. F. CONKLIN.
ELECTRIC MOTOR.

No. 511,196.  
Patented Dec. 19, 1893.

WITNESSES:  
L. C. Leaty.  
H. S. Dunn.

Oliver F. Conklin  
INVENTOR

BY R. Jay McCarty,  
ATTORNEY.

(No Model.) 2 Sheets—Sheet 2.
O. F. CONKLIN.
ELECTRIC MOTOR.
No. 511,196. Patented Dec. 19, 1893.
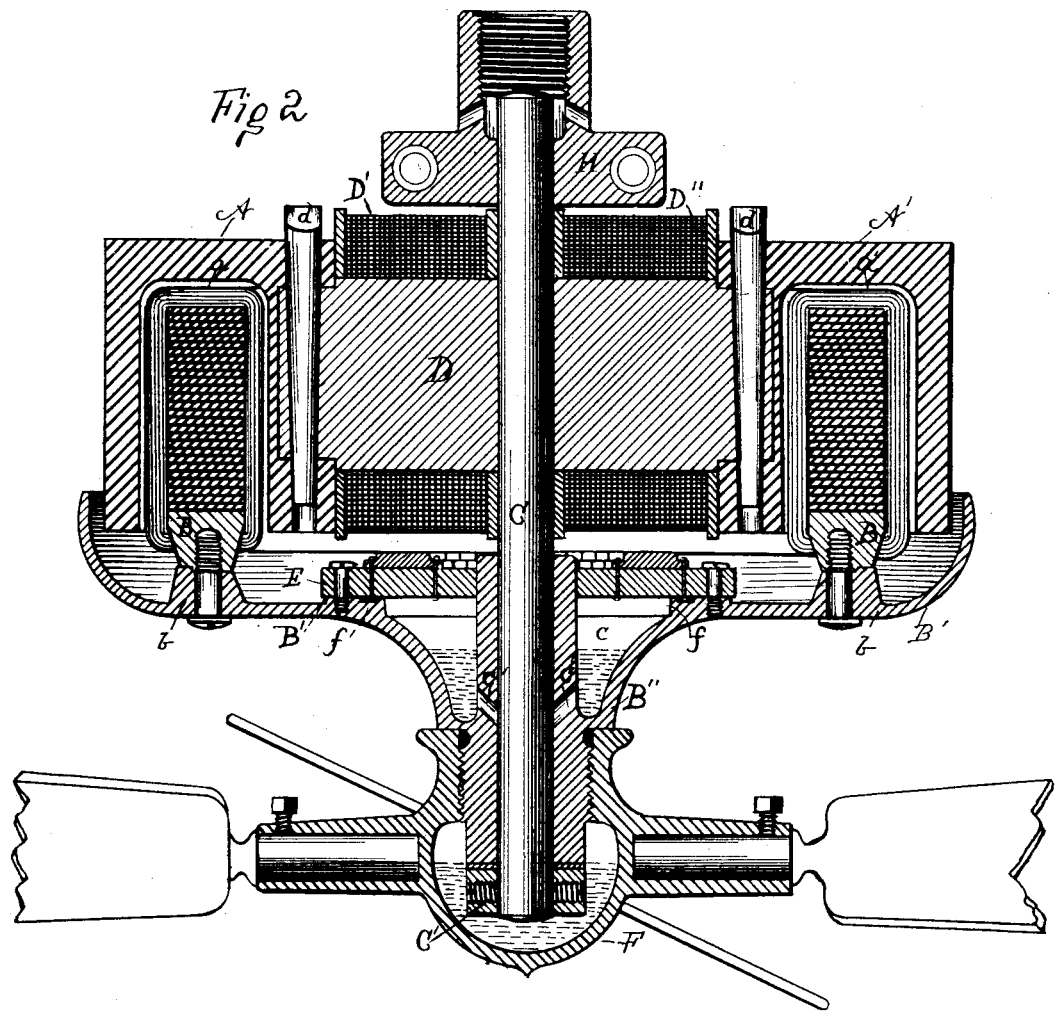
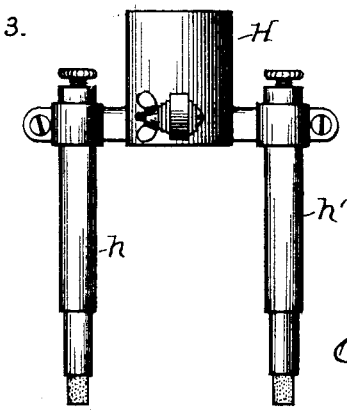
WITNESSES:
L. C. Leoty
H. S. Dunn
Oliver F. Conklin
INVENTOR
BY
R. Jay McCarty
ATTORNEY.

UNITED STATES PATENT OFFICE.

OLIVER F. CONKLIN, OF DAYTON, OHIO, ASSIGNOR TO THE DAYTON FAN AND MOTOR COMPANY, OF SAME PLACE.

ELECTRIC MOTOR.

SPECIFICATION forming part of Letters Patent No. 511,196, dated December 19, 1893.

Application filed July 5, 1893. Serial No. 479,672. (No model.)

*To all whom it may concern:*

Be it known that I, OLIVER F. CONKLIN, a citizen of the United States, residing at Dayton, in the county of Montgomery and State of Ohio, have invented certain new and useful Improvements in Electric Motors; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in electric motors of the class adapted to use in connection with ceiling fans.

The object of said improvements is, first, to obtain a compact form of field magnet by decreasing the size and weight thereof, and to reduce the resistance of the magnetic circuit, and thereby reducing the quantity of wire on said field magnet, and effecting a reduction in total of the current necessary to run the motor; secondly, to provide an improved construction of brush holder, coupling and support for the motor, and further, to provide improved and useful means for lubricating the shaft throughout its bearing. To these ends I place the field magnet and coils on the core, compactly within the armature, and the armature I place in segmental channels in the pole pieces, and by carrying said pole pieces up over and down around the armature, the cross section of the air space is materially increased where said armature is exposed to the action of the field; the result is gained of a reduction in the magnetizing force necessary to operate the motor.

The drawings herewith supplementing the specification, illustrate my improvements, and will be referred to by characters, the same reference characters being used on corresponding parts throughout the several views, of which—

Figure 1 is a plan view; Fig. 2 a vertical section on the line $x$—$x$ of Fig. 1; Fig. 3 a detached, detail view, enlarged, of the combined brush holder and shaft coupling.

A and A' indicate the pole pieces, each of which is provided with segmental channels $a$—$a'$ conforming in cross-section to, and of a depth and width slightly greater than that of the armature B—B and in which said armature is inclosed and adapted to freely revolve; the armature may be of any of the well known forms of winding but it differs considerably as to the quantity of wire necessary; it will be observed said armature is completely incased in the pole pieces, the effect of which being as before stated.

B' is the revolving supporting plate provided with a series of lugs $b$—$b$ projecting from its inner surface through which screws are driven to secure the armature to said plate; this plate is also constructed with a hub B'' in which bearing is furnished for the supporting shaft C, and a hollow portion forming a lubricating chamber $c$ from which oil is fed to the shaft through channels $c'$—$c'$.

C' indicates a collar fixed to the lower end of the shaft C and upon which the plate B' is revolubly supported by the hub portion B'' bearing on said collar.

D is the field magnet core the ends of which project into cored out parts of the pole pieces to an extent that said pole pieces overlap and entirely inclose the ends of said core; vertical pins $d$—$d$ penetrate the overlapping parts of the pole pieces and the ends of the field magnet core to secure these parts together; the field magnet is also made rigid to the shaft C by means of a screw being driven through the core into a recess in said shaft.

D'—D'' represent the field magnet coils which it will be noted are comparatively small in quantity of wire as compared to coils in a motor requiring a greater magnetic force.

The commutator plate E is attached to the bottom of plate B' by screws passing through a series of lugs; it rests upon an annular rib or ring $f$ on the inner surface of said plate and forms the upper inclosure of the oil chamber $c$. The commutator brushes are supported in holders $h$—$h'$ in sockets in laterally projecting arms carried by the coupling piece H; the stationary shaft C is coupled to this piece as is also the hollow shaft or pipe that depends from the ceiling, and which is a common feature and therefore is not shown in the drawings.

F indicates a combined oil cup and support for the fan blades that incloses the lower portion of the shaft bearing by a screw threaded engagement with the hub B″ of the supporting plate. Fig. 2 illustrates the oil chamber within this part as it does also the oil chamber c higher up on the shaft and it will be noted that the bearing of the shaft will receive an adequate supply of oil by this arrangement of the oil chambers.

Having described my invention, I claim and desire to secure by Letters Patent—

1. In an electric motor, the combination of the field magnet core, pole pieces inclosing the ends thereof, said field magnet core and pole pieces being attached by vertical pins, segmental channels in said pole pieces, an armature adapted to revolve in said segmental channels, substantially as and for the purposes specified.

2. In an electric motor, the combination with the stationary shaft, of a combined brush holder and shaft coupling consisting of the part H with laterally extending sockets, the brush holders $h$—$h'$ adapted to be supported in said sockets, substantially as herein described.

3. The combination with the armature and the stationary shaft, of the supporting plate B′ with the hub B″ on which said armature and shaft have bearing, an oil chamber $c$ in the lower part of said hub, having channels $c'$—$c'$ leading to the shaft, substantially as herein described.

4. The combination of the supporting plate B′ having a hub B″ and an annular rib, the combined oil cup and fan blade support inclosing the end of the shaft bearing by an attachment with the hub B″, substantially as herein described.

5. The combination with the stationary shaft and the collar C′ rigidly attached to the lower extremity thereof; of the supporting plate B′ provided with hub B″ having a bearing on said collar; the oil chamber $c$, and channel $c'$—$c'$ penetrating said hub; the commutator plate forming the upper inclosure of said oil chamber, as herein described.

In testimony whereof I affix my signature in presence of two witnesses.

OLIVER F. CONKLIN.

Witnesses:
GEORGE H. WARD,
R. JAY MCCARTY.